(12) United States Patent
Beltt et al.

(10) Patent No.: US 10,951,489 B2
(45) Date of Patent: Mar. 16, 2021

(54) SLA COMPLIANCE DETERMINATION WITH REAL USER MONITORING

(71) Applicant: Digital River, Inc., Minnetonka, MN (US)

(72) Inventors: Mark Aron Beltt, St. Louis Park, MN (US); Ryan Patrick Douglas, Edina, MN (US); Chad Martin, Minneapolis, MN (US); Marcus Mechmann, Velbert (DE); Michael Edwin Borchert, Minneapolis, MN (US)

(73) Assignee: DIGITAL RIVER, INC., Minnetonka, MN (US)

( * ) Notice: Subject to any disclaimer, the term of this patent is extended or adjusted under 35 U.S.C. 154(b) by 371 days.

(21) Appl. No.: 15/394,051

(22) Filed: Dec. 29, 2016

(65) Prior Publication Data
US 2017/0187583 A1   Jun. 29, 2017

Related U.S. Application Data

(60) Provisional application No. 62/272,241, filed on Dec. 29, 2015.

(51) Int. Cl.
| | | |
|---|---|---|
| *G06F 15/173* | (2006.01) | |
| *H04L 12/24* | (2006.01) | |
| *H04L 29/08* | (2006.01) | |

(52) U.S. Cl.
CPC .......... *H04L 41/5009* (2013.01); *H04L 67/02* (2013.01); *H04L 67/1004* (2013.01)

(58) Field of Classification Search
CPC .. H04L 41/5009; H04L 67/02; H04L 67/1004

USPC .................................................. 709/224, 223
See application file for complete search history.

(56) References Cited

U.S. PATENT DOCUMENTS

| | | | | |
|---|---|---|---|---|
| 8,219,562 B1* | 7/2012 | Rothschild | ............. | G06F 16/13 |
| | | | | 707/741 |
| 2002/0078233 A1* | 6/2002 | Biliris | ..................... | H04L 29/06 |
| | | | | 709/238 |
| 2011/0126168 A1* | 5/2011 | Ilyayev | ................. | G06F 9/5072 |
| | | | | 717/103 |
| 2011/0137973 A1* | 6/2011 | Wei | ..................... | H04L 67/1008 |
| | | | | 709/202 |
| 2012/0232947 A1* | 9/2012 | McLachlan | ............ | G06Q 10/06 |
| | | | | 705/7.23 |
| 2013/0227078 A1* | 8/2013 | Wei | ..................... | H04L 67/2814 |
| | | | | 709/219 |
| 2015/0304177 A1* | 10/2015 | Greathouse | ......... | H04L 41/5009 |
| | | | | 709/224 |

(Continued)

*Primary Examiner* — Philip B Tran
(74) *Attorney, Agent, or Firm* — Billion & Armitage (57) ABSTRACT

Compliance with a Service Level Agreement (SLA) between an ecommerce provider and its customer may be determined using real user monitoring by collecting data for each HTTP/HTTPS request and response sent to the ecommerce provider. The presence of a content delivery network (CDN), also monitoring every HTTP/HTTPS request sent from a user, through the CDN provides an external, third-party confirmation of compliance. Real user monitoring is collected at the SaaS system by triggering an event rule, collecting data regarding the performance of the request and the response, and logging the created message. The log is processed and stored in a performance monitoring system where indexed for calculations and presentation.

20 Claims, 6 Drawing Sheets

(56) References Cited

U.S. PATENT DOCUMENTS

2016/0191600 A1* 6/2016 Scharber ............. H04L 67/1097
709/223
2017/0264701 A1* 9/2017 Wei ..................... H04L 67/2814

* cited by examiner

FIG. 6

US 10,951,489 B2

SLA COMPLIANCE DETERMINATION WITH REAL USER MONITORING

RELATED APPLICATIONS

This application claims the benefit of U.S. Provisional Application No. 62/272,241 filed 29 Dec. 2015, entitled "SLA with Real User Monitoring System and Methods," which is incorporated herein by reference.

FIELD OF THE INVENTION

The present invention relates generally to the analysis and presentation of information derived from data collected from disparate systems, transformed into meaningful system monitoring data that allows computation of actual performance measurements for determining SLA compliance.

BACKGROUND OF THE INVENTION

Web services providers generally enter into a service level agreement (SLA) with their clients, guaranteeing that their systems will be available for use a particular percentage of the time. Uptime is crucial to merchants or others providing services to end users over the internet. A merchant who depends on internet sales may lose revenue when systems are down and frustrated potential buyers decide to go elsewhere rather than deal with unresponsive webstores. Because of this, SLA performance requirements are often very tight, with uptime requirements over 99%.

Determining compliance with SLA performance requirements typically involves synthetic monitoring by a third party. However, this does not provide an accurate representation of the user's experience. When a Content Delivery Network (CDN) is provided as part of the overall commerce delivery system, the CDN may be a source of real user, third-party compliance measurement, but that information does not help the measured system ensure compliance at any time. What is needed is a system and method for determining compliance with performance requirements that allows the system to react to performance deterioration before the system is in danger of violating the SLA performance requirement.

SUMMARY

Embodiments of the invention are directed to systems and methods for more accurately determining compliance with an internet-based service provider's service level agreement (SLA). Among other things, SLAs set performance targets and minimal levels of service that the service provider guarantees its customers. When the service is a Software as a Service (SaaS) e-commerce system, uptime is probably the single most important metric a customer will be concerned with. A SaaS customer wants a guarantee that the system will be available for use whenever it is needed. Uptime of 99.999% is often expected. Failing to receive that level of service may mean lost revenue and dissatisfied customers for the web merchant.

Synthetic monitoring is a popular, but expensive way to monitor compliance with an SLA, but it is also not particularly accurate in terms of providing the customer with the user experience and calculating uptime can be both under- and overstated. What is needed is a system and method for real user traffic monitoring from a user to a website hosted by a Software as a Service (SaaS) provider hosting thousands of webstores in a highly-distributed environment, that has third party credibility, in combination with synthetic monitoring. The invention described herein provides those features and offers other improvements over the prior art.

DETAILED DESCRIPTION

Embodiments of the present invention may be described more fully hereinafter with reference to the accompanying drawings, in which some, but not all, embodiments of the invention are shown. The invention may be embodied in many different forms and should not be construed as limited to the embodiments set forth herein; rather, these embodiments are provided so that the disclosure may enable one of ordinary skill in the art to make and use the invention. Like numbers refer to like components or elements throughout the specification and drawings. Furthermore, embodiments of the present invention use the term "user" or "customer" or "shopper." It will be appreciated by someone of ordinary skill in the art that the user may be an individual, another internet-based system, or organization running such a system.

Embodiments of the invention are directed to systems and methods for more accurately determining compliance with a Software-as-a-Service (SaaS) provider's Service Level Agreement (SLA) with its clients, typically a web merchant. The invention enables a SaaS host/provider to use real user traffic logged by a Content Delivery Network (CDN) to determine compliance with an SLA rather than rely fully on synthetic monitoring, which is expensive and may not reflect the actual experience of the end user. In addition, the provider is able to calculate its own measurements in order to monitor performance of its system and determine continual compliance with the SLA.

Various embodiments or features will be presented in terms of systems that may include a number of devices, components, modules and the like. It is to be understood and appreciated that the various systems may include additional devices, components, modules, etc., and/or may not include all of the devices, components, modules, etc., discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in a computing device's non-transitory storage medium, registers, a hard disk, a removeable disk, a CD-ROM or any other form of non-transitory storage medium known in the art. In one or more embodiments, the functions described may be implemented in hardware, software, firmware, or any combination thereof. If implemented in software, the functions may be stored or transmitted as one or more instruction or code on a computer-readable medium.

Systems and methods are described herein that allow a SaaS provider to determine compliance with an SLA performance requirement using a combination of real user and synthetic monitoring when a third-party component, such as a CDN, is integrated with the SaaS system and is employed to capture and log the HTTP/HTTPS requests and responses for each user. The logs created by the CDN provide third-party credibility, and can be integrated with logs created by the SaaS provider that measure the same request/response data at the SaaS system itself as it provides near real-time log message processing for internal performance monitoring.

Figure 1:
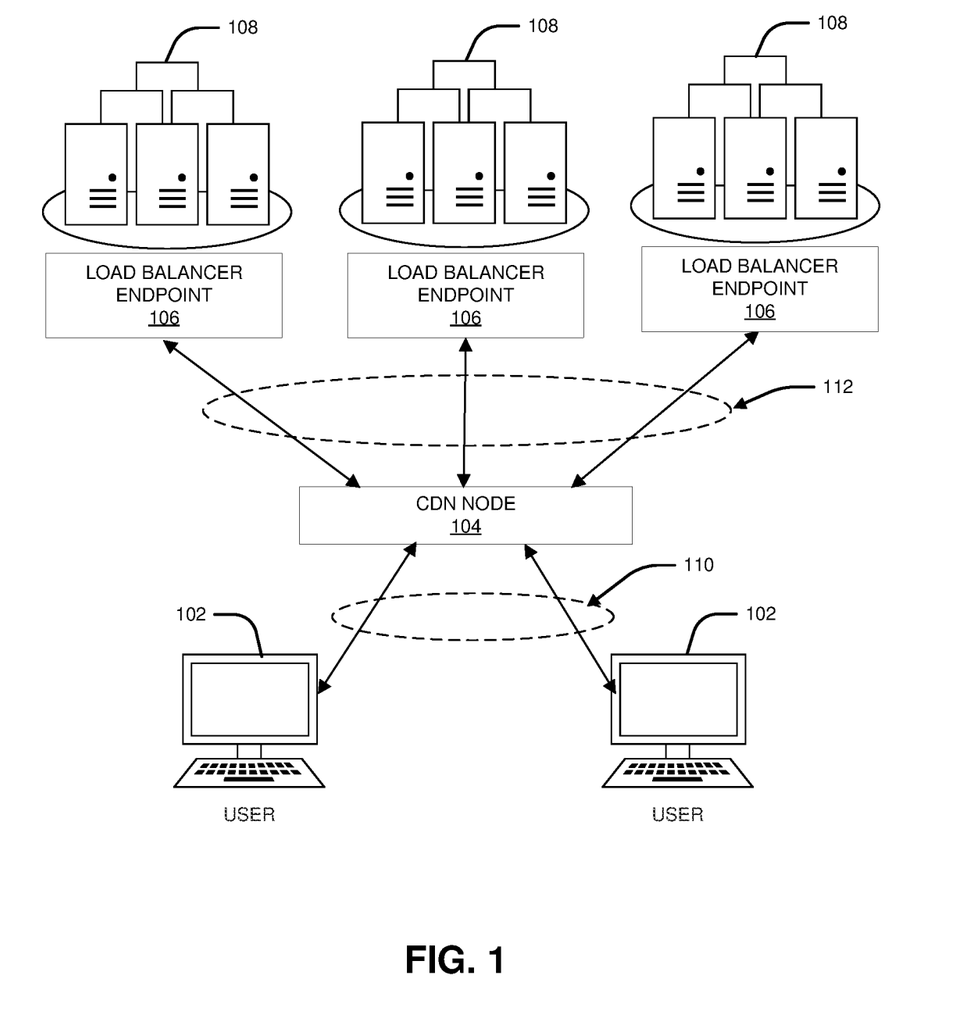
FIG. 1 illustrates the system and an environment for practicing embodiments consistent with the present disclosure.

FIG. 1 illustrates an exemplary, abstract environment for practice and use of the embodiments described herein. In most embodiments, a user 102 is an individual accessing a particular domain name for the purpose of creating a transaction with that domain. The domain is usually owned by a merchant who has entered into an agreement with a SaaS provider for services provided over the internet. As described above, that agreement will include an SLA that guarantees, among other things, a certain level of performance, typically defined as "uptime" or a percentage of time that the system is available to users. Users 102 wishing to initiate transactions with websites over the internet enter a domain name into their browser address bar, click a link or initiate a transaction from a desktop application. The browser requests DNS services which resolve the domain name to a web IP address. In some embodiments, the SaaS provider contracts with a CDN 104 for services which may include edge caching (caching on servers geographically close to the user), web optimization and DNS services. Because a CDN 104 has direct HTTP/HTTPS connectivity with the user 102 over TCP/IP, the CDN 104 is in a position to use data about the user such as its IP address or its cookies to direct the user's request to the appropriate SaaS provider endpoint. The CDN may access a file located on the load balancing endpoint device 106 to resolve domain name calls to websites operated by the SaaS provider and hosted in SaaS data centers throughout the world. A DNS load balancing endpoint allows the CDN 104 to determine precisely where to send the users' request according to rules for distributing traffic among the SaaS provider's data centers 108. Rules may include instructions on which location is geographically closest to the user 102, and may also include instructions on how requests are to be rerouted in the case of a failure of one or more data centers 108.

The relationships in FIG. 1 illustrate the HTTP/HTTPS communications performed by the CDN 104 using TCP/IP. These are the client side communications 110 between the user and the CDN 104 and server side 112 communications with load balancer end points 106 located at the SaaS provider's data centers 108. In one embodiment, the CDN may select between several different domain names or IP addresses and all of these are assumed to be highly available web servers. In another embodiment, the CDN 104 selects between several different domain names or IP addresses and performs synthetic health-checking to determine whether or not the web servers on those IP addresses are currently available or not. In yet another embodiment, the CDN 104 selects between several different domain names or IP addresses and uses its own monitoring of real users to determine whether or not the web servers on those IP addresses should continue receiving traffic.

There are alternative ways of determining the HTTP/HTTPS communication path between a user's web browser and a web merchant's website. In one embodiment, the end user's computer contacts an end user's DNS service and asks for the IP address of the merchant website. The end user's DNS service contacts the CDN DNS service and asks for the IP address of the merchant website. The CDN DNS server uses the IP address of the end user's DNS server to make a topology/routing decision, selects an appropriate CDN note, and returns the IP address of that node to the end user's DNS server. The end user's DNS server returns that IP address to the end user's computer, possibly caching this DNS result for re-use at a later time. Finally, the end user's computer uses TCP/IP to establish an HTTP or HTTPS connection to the CDN node and initiate one or more requests.

In the event that the CDN is unable to satisfy these requirements using its own cached data, per HTTP/HTTPS request, the CDN node uses information about the end user's computer (including IP address, GEO-IP lookup data about that IP address, and end user browser cookies) to select between a list of SaaS service nodes maintained in a CDN file. As noted above, the CDN can use various forms of logic to decide which node to use. In some embodiments, the CDN may has the end user's IP address to an integer modulo 2, and make a GEO-IP look up on the IP address, decoding this lookup to a set of defined locations. The result is one of the SaaS load balancer end points/data centers and the result is saved as an end user cookie in case their IP address changes before a subsequent visit. Many other paths to connection are possible, and all would be appropriate for an embodiment of the invention described herein. Once the end point has been established, the CDN node contacts the CDN DNS server and asks for the IP address of the selected SaaS node. The CDN DNS server contacts the SaaS DNS server to ask for the IP address of the SaaS node. In some embodiments, the SaaS DNS server may be a global traffic manager and the domain name of the SaaS node may be a DNS load balancing endpoint file. The CDN NDS server returns that IP address to the CDN node, possibly caching this DNS result for re-use at a later time. The CDN node uses TCP/IP to establish an HTTP or HTTPS connection to the SaaS node and initiates one or more requests.

TCP/IP connections are comparatively long-lived, governed by HTTP keep-alive semantics and similar. Typically, these DNS lookups only happen once or twice per commerce transaction because the TCP/IP connections remain open continuously for many minutes once established.

Figure 2A:
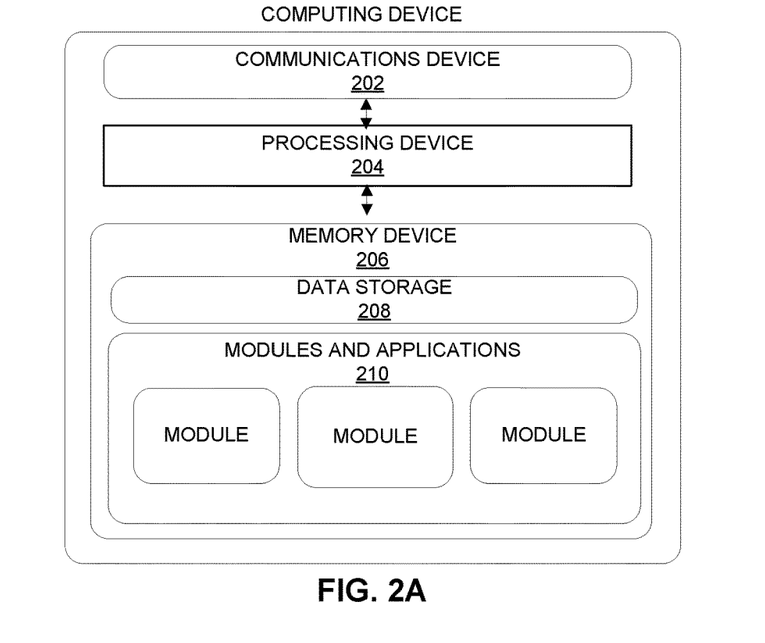
FIG. 2a illustrates components of a general computing device.
Figure 2B:
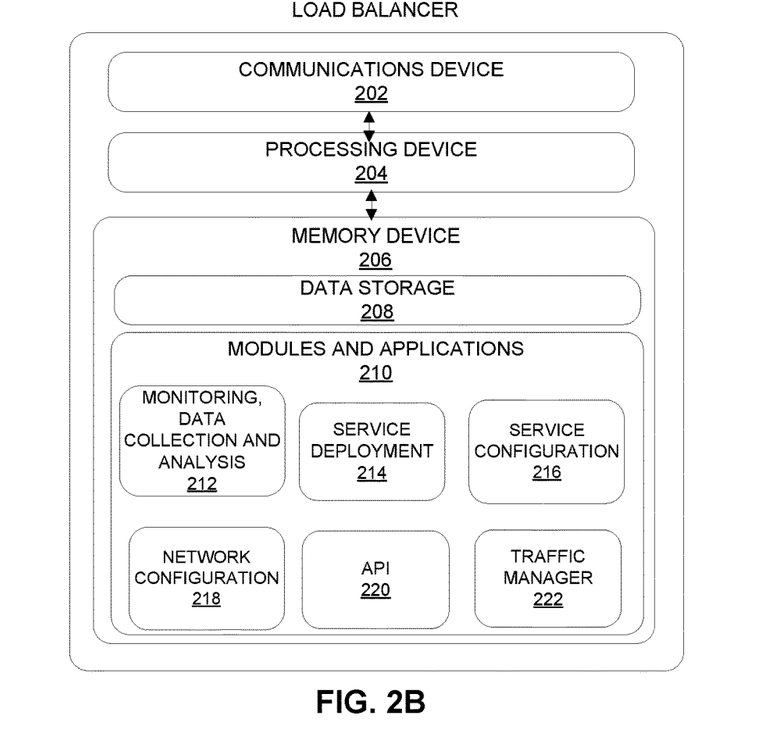
FIG. 2b illustrates some of the special components of a general computing device.

Each of the user machine 102, the CDN 104, the load balancing endpoint device 106 and the data centers 108 are comprised of computing devices which are further comprised of a communications device 202, a processing device 204, and a memory device 206 including data storage 208 and modules and applications containing computer instructions 210, such as is illustrated in FIG. 2A. Each machine is comprised of components that meet a level of complexity and capacity necessary for the performance of its intended use. A data center may employ a large number of servers—from dozens to hundreds or more—that are used to capture transactions for the SaaS application, each providing an instance of the application. There may be one load balancer endpoint 106 at each data center 108, or there may also be many more, up to and including one load balancer per SaaS application instance. FIG. 2B illustrates a load balancing computing device which may include high performance communications 202 and processor 204 components, and a large volume of memory 206 for storage of both data 208 and modules 210 comprising computer instructions, which when operated on by the processor perform various functions such as collecting and analyzing system monitoring data 212, deploying services 214, configuring services 216, configuring networks 218, processing application programming interface (API) calls 220 and managing traffic 222. Similarly, the CDN 104 and the SaaS data centers 108 comprise modules and applications that perform their various functions, such as caching, web optimization and DNS services for the CDN 104 and API processing, system monitoring and ecommerce functions for the SaaS data centers 108.

Figure 3:
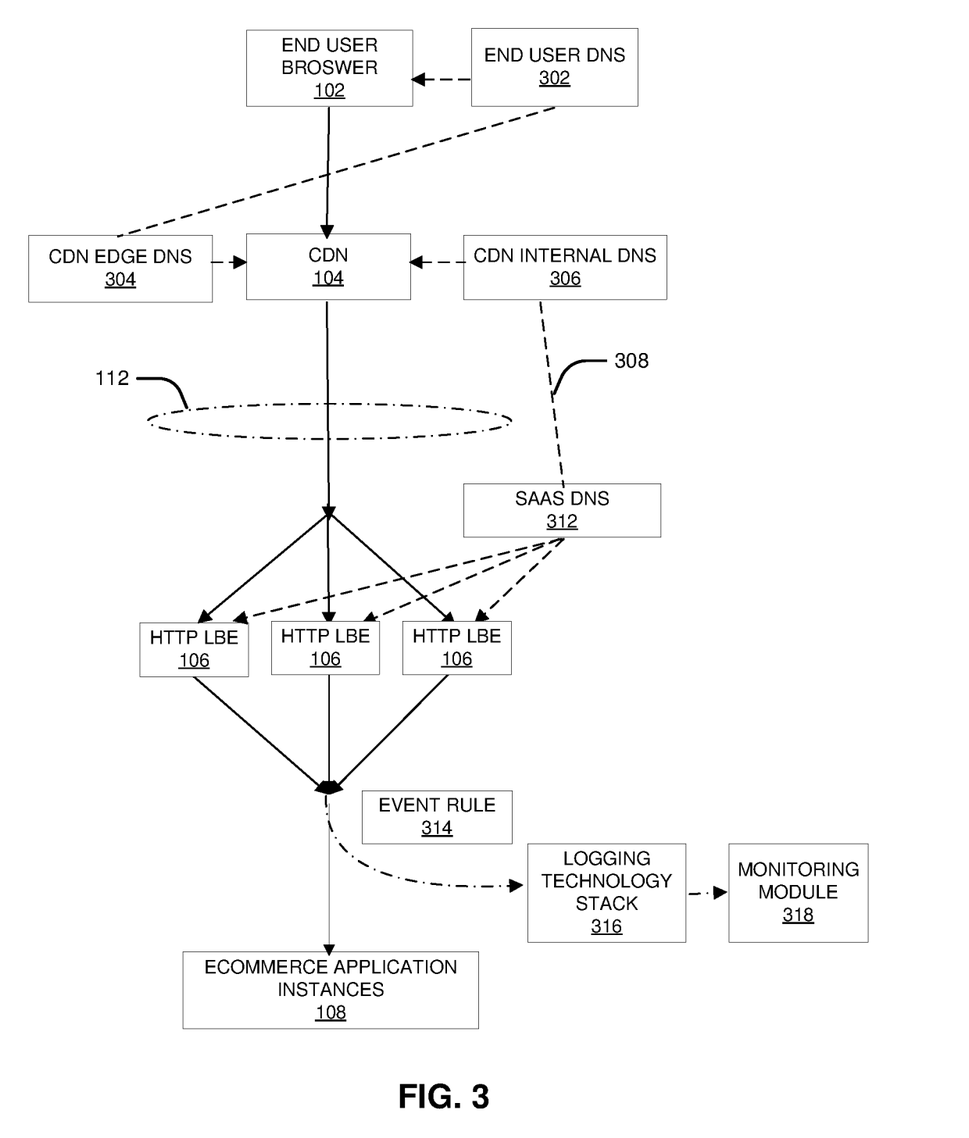
FIG. 3 illustrates the flow of information from a user request to data monitoring and analysis.

FIG. 3 illustrates an exemplary use of an embodiment of the invention. In this diagram, solid lines illustrate TCP/IP communications between nodes and dashed arrows indicate DNS communication between nodes. A user 102 will access a webstore 104 by its universal resource locator (URL). An end user DNS service 302 communicates with a CDN Edge DNS service 304, locating the CDN 104, which searches its internal DNS records 306 to find the IP address for the site (here, the ecommerce application instances) 108. The CDN node 104 communicates with the user 102 browser and a SaaS origin server (the server containing the original web page, as distinguished from a cache server) in a data center identified using HTTP/HTTPS protocol. The CDN internal DNS service communicates with SaaS provider DNS servers at the DNS load balancing end point (LBE) 106 (shown in FIG. 1) using DNS protocol. The CDN 104 selects an appropriate data center using the rules discussed previously, then connects with the SaaS HTTP/HTTPS Load Balancing Endpoint (HTTP LBE) 106 via TCP/IP on behalf of the end user 102. As was described earlier, the CDN 104 makes a request to the IP address it chooses, based on a combination of topology (GEO-IP) rules and other considerations such as endpoint availability, SaaS preferences, and previous end user session state as indicated in a cookie. The CDN 104 has a direct connection 304 to the origin server 108 (e-commerce server within the data center) and may collect data indicating that the user's 102 request message has reached the origin server 108.

The CDN 104 may log every request made for a particular origin server 108 at 112. An SLA performance requirement may be a guarantee that the origin server is available to the CDN 104 a certain percentage of the time. As long as the CDN 104 log data 112 doesn't show any failures in its attempts to talk to the origin server 108, and the origin server 108 responds to a sufficiently high percentage of the CDN's 104 requests with well-formed, as-intended responses, the message attempt may be considered a "pass" for SLA purposes. This is true whether synthetic or other external monitoring services never exercise the server even once. Thus, using traffic logging between a CDN 104 and an origin server 108 obviates the need for external or synthetic monitoring to measure an SLA for the origin server 108, and compliance with the SLA may be determined using this log data 112.

The system and method as described above provides an authoritative, third-party evaluation of the SLA performance requirements. However, it does not provide the SaaS provider 108 with that same information in a useful way. From the SaaS provider's 110 perspective, a system that responds to the user's 102 request, either too slowly, or not at all, is a problem that must be addressed in real time. The CDN 104 may deliver this data to a provider 108 in batches, but the provider 108 must have the same information in real time in order to investigate system issues or redirect incoming traffic, in other words, to respond appropriately before an outage occurs. Therefore, the SaaS provider 108 must have a way to determine the health of the system on its own. Referring now to FIG. 3, this may be provided by a SaaS transaction logging module and subsystem comprising an event rule 314, logging technology stack 316 and monitoring system 318. This subsystem 314, 316, 318 collects data regarding the requests hitting the HTTP LBE 106 and the responses it receives from the ecommerce application instance endpoint 108 to which the request is directed.

As was described above, the CDN 104 directs the request to the appropriate data center 108. Each data center is comprised of a plurality of servers hosting instances of the provider's web clients whose locations are identified be a HTTP LBE 106 file hosted on a local traffic manager. The SaaS transaction logging module and subsystem event rule 314 may trigger on an event such as a request message (event) to collect data related to request and its response. An exemplary rule may trigger on HTTP_REQUEST and HTTP_RESPONSE, collect data and create a log message with the data to be fed into the logging module and subsystem technology stack 316 for system monitoring 318 and reporting. Upon firing, the event rule 314 captures a number of variables when a request is initiated by the CDN 104, including a timestamp, the URL being requested, and some of the request headers included in the request. When a response is sent to the CDN 104, the rule composes a formatted log message by combining those captured variables with some data about the response, including another timestamp, the IP addresses involved in the request, the HTTP response code, and some of the response headers included in the response. One of ordinary skill in the art will recognize that the event rule may specify collection of any parameter that is useful for the intended purpose and is not limited to those listed above. The formatted log message is sent via network to a remote logging server, included in 316 and shown in more detail in FIG. 4.

Figure 4:
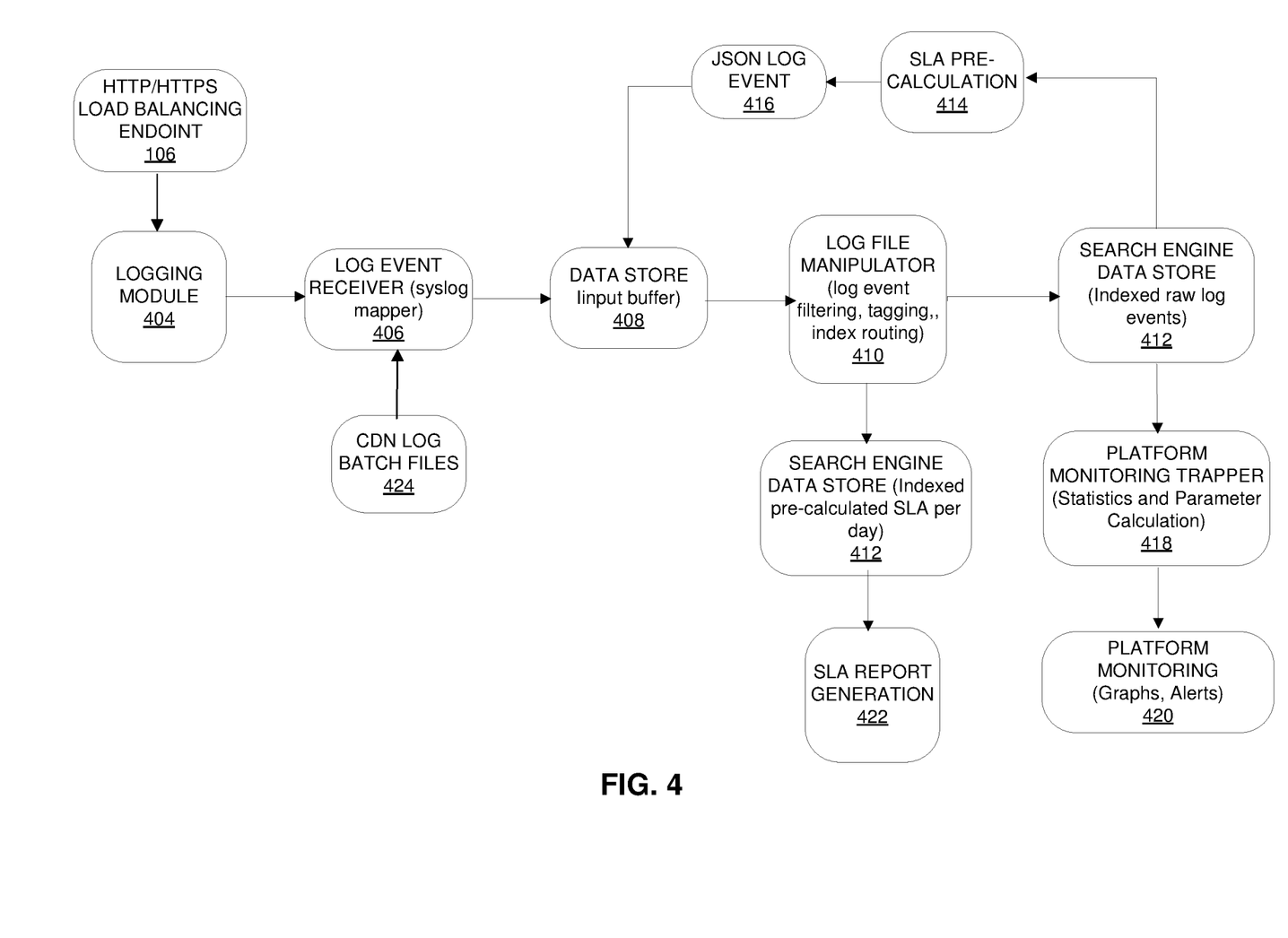
FIG. 4 illustrates an exemplary log data collection and processing system providing reporting, monitoring and alerts of system performance.

Referring now to FIG. 4, a logging module 404 is connected via syslog protocol to a TCP load balancer endpoint (HTTP LBE) 106 backed by one or more log event TCP receiving inputs. A request to the HTTP LBE 106 results in triggering an event 314 in the logging module 404, which comprises the event rule 314, the logging technology stack 316 and the monitoring module 318. The logging technology stack 316 and monitoring module 318 may be comprised of modules required to perform functions of receiving, parsing, translating, filtering, tagging, and indexing log events in a form that may be used for calculating, reporting and monitoring performance metrics. The functionality, form and format of the modules required to perform these tasks may depend on the particular tools selected or built for the reporting and monitoring functions. The modules illustrated in FIG. 4 are an example of one embodiment of the invention described herein.

A logging module 404 may direct the collection of session variables as a log event, triggered by a request, and then takes on additional variables when the response occurs. Logs are created in a particular format, such as CSV. A log event receiver 406 is comprises a pool of log collection instances configured with a TCP listener, which mutates the message from its original format as created into a JSON object so it may be consumed and processed by the system. The data store 408 receives the data from the event receiver and may act as a message broker, translating and re-parsing the message received on these inputs and forwards the data to a platform monitoring system data store for further collection, parsing and storage. A log file manipulator 410 provides filtering, tagging and index routing of the event data in JSON object form. The indexed raw logged events may be stored in a database where they will be used to calculate statistics and generate reports. The search engine 412 stores log events indexed for various use cases related to monitoring and demonstrating performance for SLA and other purposes. Indexed log events and pre-calculated variable data for future reporting 422. This may be used to preview SLA metrics. The platform monitoring system search engine 412 queries the data store 408 and performs parameter and statistics calculations 418, such as rolling 5-minute (a configurable parameter) windows of requests and responses. Raw log events may be forwarded to a pre-calculation module 414 and a JSON log event module 416 which translates the log information and stores it in the data store in the translated format 408. The platform monitoring system provides system graphs and alerts 420 for real time monitoring, and SLA reports for compliance determination 422. The graphs and alerts 420 allow operators to determine the system's service health. Optionally, a CDN batch file collection module 424 may be included to retrieve and feed in log files for every request created by the CDN 104.

A script may be used to generate a rolling, pre-calculated SLA based on a 5-minute histogram throughout a given day. The output of this calculation may be further used for periodic (e.g. monthly) reporting. A monthly SLA calculation may be used to generate an overall monthly SLA for a defined key process indicator (KPI). KPIs may be based on locale and related to site and store locations within a 5-minute histogram. Service health may be determined based on (1) a sufficient percentage of good responses from users indicating the system is PASSing, or is in compliance with, its SLA requirement, or (2) an insufficient percentage of good responses from users, or no data at all from users indicating that the system is FAILing, or is in non-compliance with, its SLA requirement.

Although the logging module and associated monitoring and reporting components allow the operator to determine performance on a timely basis, it may not be acceptable for SLA compliance because the data is generated by the service provider. Therefore, the service provider may offer reports generated from this system in combination with the data measured at the CDN 104, as proof of compliance with the SLA performance requirement.

Figure 5:
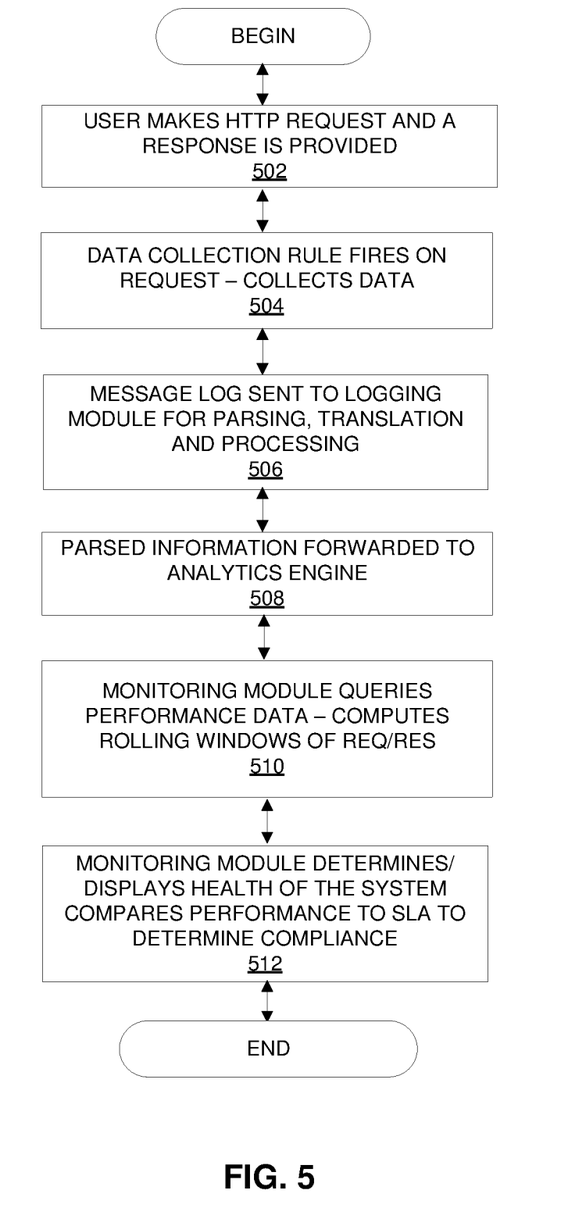
FIG. 5 illustrates a flow diagram for processing monitoring data into SLA compliance information.

The system and method illustrated in FIG. 4 and described above allows the SaaS provider to monitor the experience of the user and performance of the system. As is illustrated in FIG. 5, the user makes an HTTP request 502. A data collection rule fires upon identifying the request and collects data about the request and the subsequent response 504. A message log is sent to a logging module for parsing, translation and other processing 506. The processed message data is forwarded to an analytics engine 508. A monitoring module queries performance data and computes rolling windows of request/response data 510. The monitoring module displays the health of the system and compares the performance to its SLA performance target to determine compliance with the SLA 512.

Figure 6:
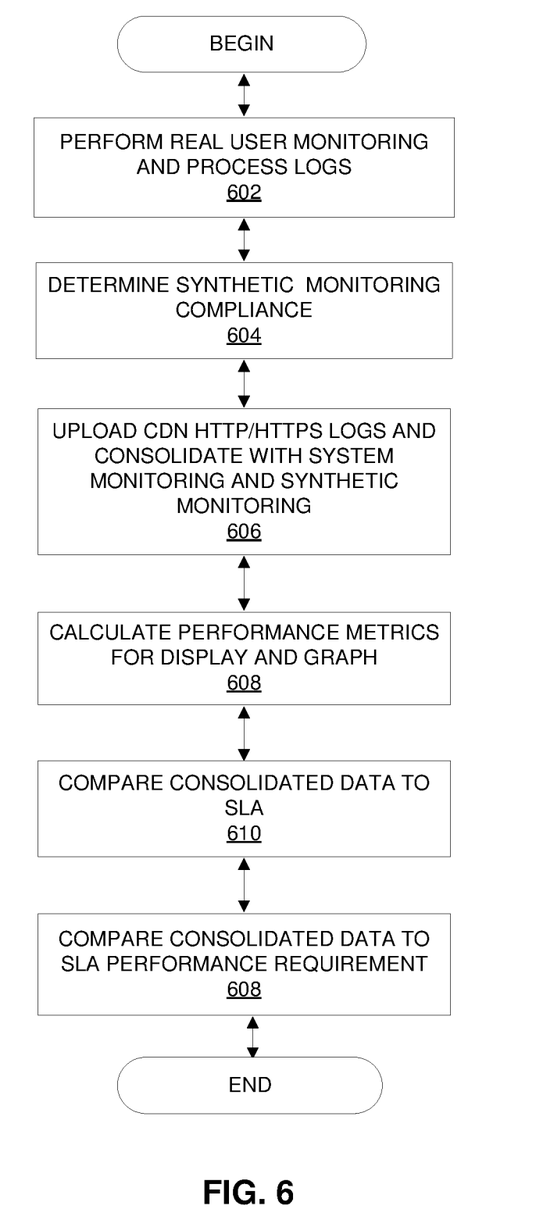
FIG. 6 illustrates a flow diagram for processing monitoring data into SLA compliance information, where the information includes synthetic monitoring results.

FIG. 6 illustrates a process for demonstrating compliance to a customer requiring external data to demonstrate compliance with the SLA. Real user monitoring is performed and gathered in a monitoring module as described above 602. Synthetic monitoring, such as that done with a tool such as Keynote offered by Keynote Systems is performed for compliance with the performance component of the service level agreement 604. HTTP/HTTPS request/response data logs are uploaded into the monitoring module for consolidation with SaaS real user monitoring 608 and calculations are made for display and graph 610 and comparison with SLA requirements 612.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method of determining a service level for an internet-based Software as a Service comprising:
capturing a plurality of actual HTTP/HTTPS requests;
logging the plurality of HTTP/HTTPS requests;
capturing a plurality of actual responses related to the logged plurality of requests; and
logging the plurality of responses for a website hosted by a Software as a Service system; and
determining a service level request value for the website hosted by the Software as a Service system from the logged plurality of logged requests and the plurality of corresponding logged responses, the service level request value including a percentage for website availability.

2. The method of claim 1 wherein capturing a plurality of actual HTTP/HTTPS requests includes triggering an event at the Software as a Service system upon an actual http/https request.

3. The method of claim 1 wherein the capturing of a plurality of actual HTTP/HTTPS includes triggering an event upon an actual HTTP/HTTPS request, the event trigger being a data collection rule that fires upon an HTTP/HTTPS request.

4. The method of claim 1 wherein logging the plurality of HTTP/HTTP requests includes adding a time stamp to the request.

5. The method of claim 1 wherein determining a service level request value from the logged plurality of logged requests and the plurality of corresponding logged responses includes determining at least one metric indicative of the level of service for the internet-based Software as a service.

6. The method of claim 1 further comprising comparing the determined service level request value obtained from a plurality of actual HTTP/HTTPS requests to a service level request value produced by a synthetic monitoring of the Software as a Service.

7. The method of claim 1 further comprising combining the determined service level request value obtained from a plurality of actual HTTP/HTTPS requests and a service level request value produced by a synthetic monitoring of the Software as a Service to yield a third service level request value.

8. The method of determining a service level for an internet-based Software as a Service of claim 1 wherein the percentage for website availability is assessed substantially continually using real user traffic in near real time.

9. A computer system for determining a service level for an internet-based Software as a Service comprising:
- an event monitor module associated with a Software as a Service system that
  - receives a first event input for a HTTP/HTTPS request at a Content Delivery Network; and
  - receives a second event input for an HTTP/HTTPS response from a Content Delivery Network;
- a message log that receives a message for a first event input and receives a message for a second event input;
- a logging module for parsing the message for the first event input and for parsing the message for the second event input;
- a performance monitoring module associated with the Software as a Service system which includes an analytics module, the performance monitoring module determining an actual service level performance value for the Software as a Service system from parsed information from the logging module associated with the first event input and the second event input,
- the computer system including computer hardware and software, the logging module, the performance monitoring module, and the analytics module including a combination of hardware and software.

10. The computer system for determining a service level of an internet-based Software as a Service of claim 9 wherein the first event input and the second event input are received from a Content Delivery Network and used to determine an actual service level to compare with a Service Level agreement.

11. The computer system for determining a service level of an Internet-based Software as a Service of claim 9 wherein the Software as a Service provider determines a synthetic service level performance value via synthetic monitoring, the synthetic service level performance value compared to the actual service level performance value.

12. The computer system for determining a service level of an Internet-based Software as a Service of claim 11 wherein the determination of the actual service level performance value is substantially independent of the determination of the synthetic service level performance value.

13. The computer system for determining a service level of an Internet-based Software as a Service of claim 9 wherein the Software as a Service provider determines a synthetic service level performance value via synthetic monitoring, the synthetic service level performance value combined with the actual service level performance value to produce an overall service level value.

14. The computer system of claim 9 wherein the actual service level of performance is calculable in real time.

15. The computer system of claim 9 wherein the actual service level value is calculated over a selected period of time, the selected period of time being less than a period of time in which a customer of the Software as a Service determines a similar service level value.

16. The computer system of claim 9 wherein the first message and the second message are in a first format and changed to a second format in the logging module.

17. The computer system of claim 9 wherein the performance monitoring module also outputs metrics associated with the system other than the service level value.

18. The computer system of claim 17 wherein the actual service level performance value is used to correct service levels when the service level performance drops below a selected level.

19. The computer system for determining a service level for an internet-based Software as a Service of claim 9 wherein the actual service level performance value includes a percentage for website availability.

20. A method of determining a service level for at least one website comprising:
- using a Software as a Service system to host the at least one website, the system including a Content Delivery Network;
- collecting request data from the Content Delivery Network;
- collecting response data associated with the request data from the Content Delivery Network; and
- determining a service level for the website hosted by the Software as a Service system using the collected request data and the collected response data.

* * * * *